April 3, 1951     J. O. SABIN     2,547,286
ANIMATED DECOY
Filed Oct. 18, 1946     3 Sheets-Sheet 1
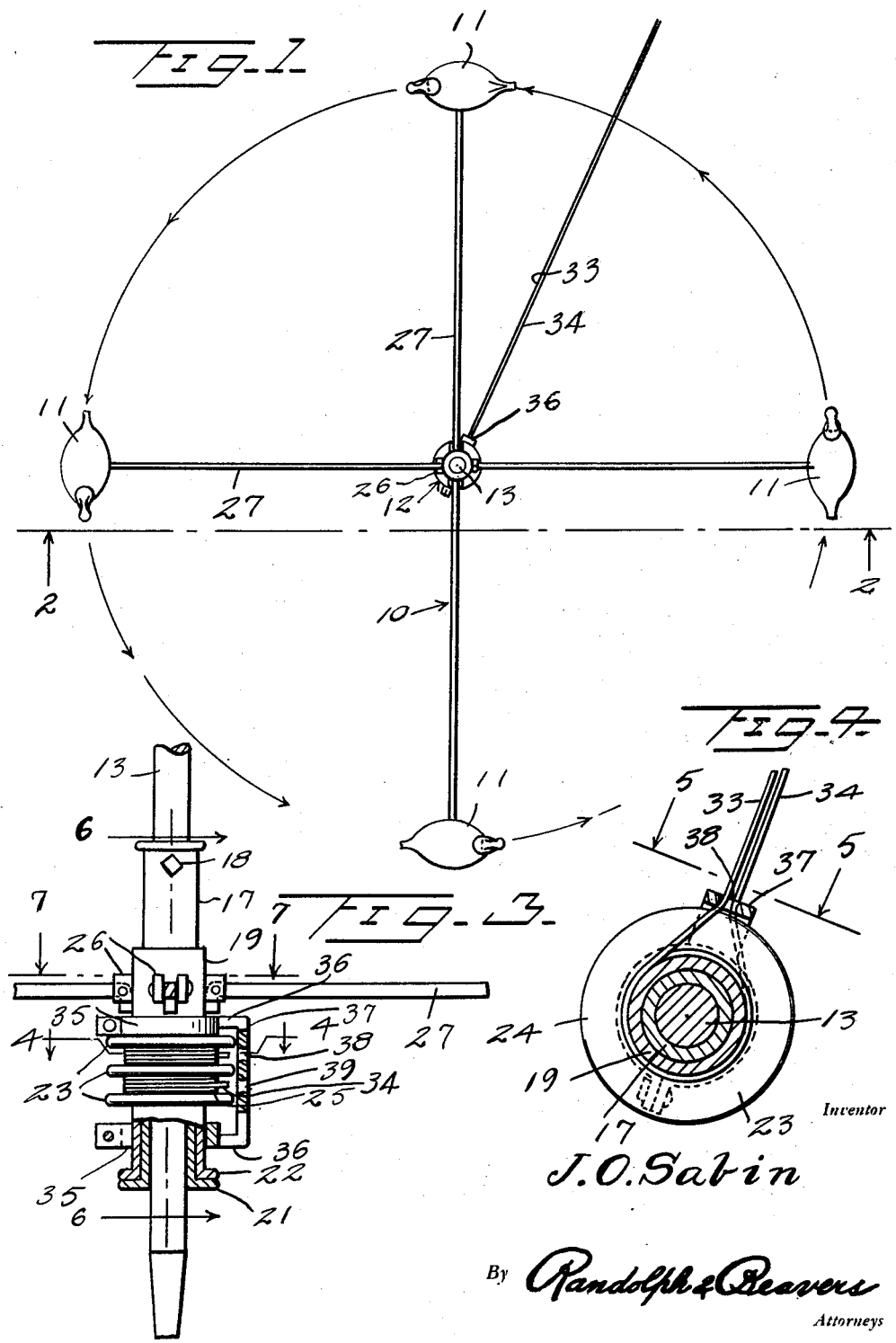
Inventor
J. O. Sabin
By Randolph & Beavers
Attorneys

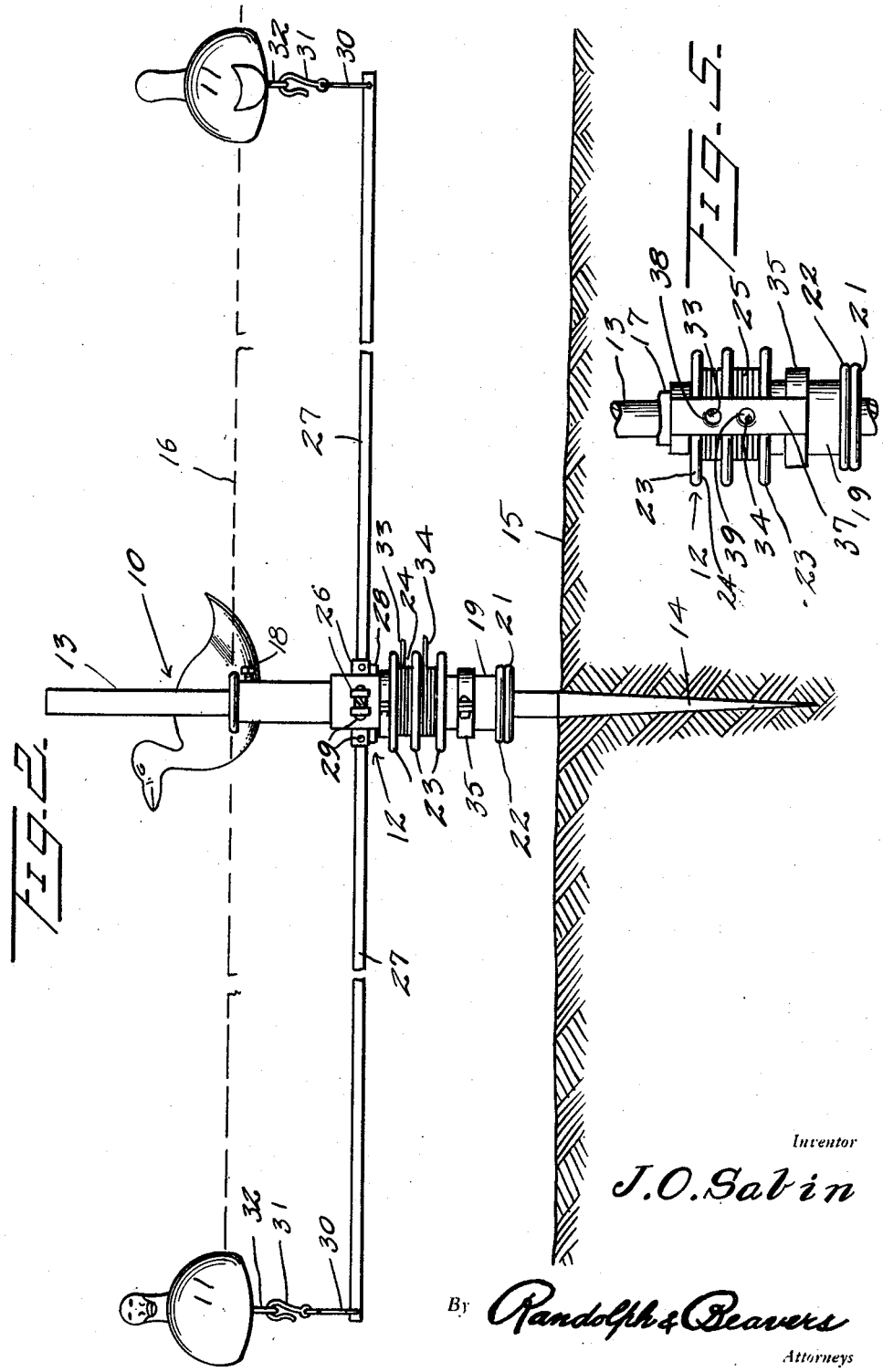

April 3, 1951 J. O. SABIN 2,547,286
ANIMATED DECOY
Filed Oct. 18, 1946 3 Sheets-Sheet 3
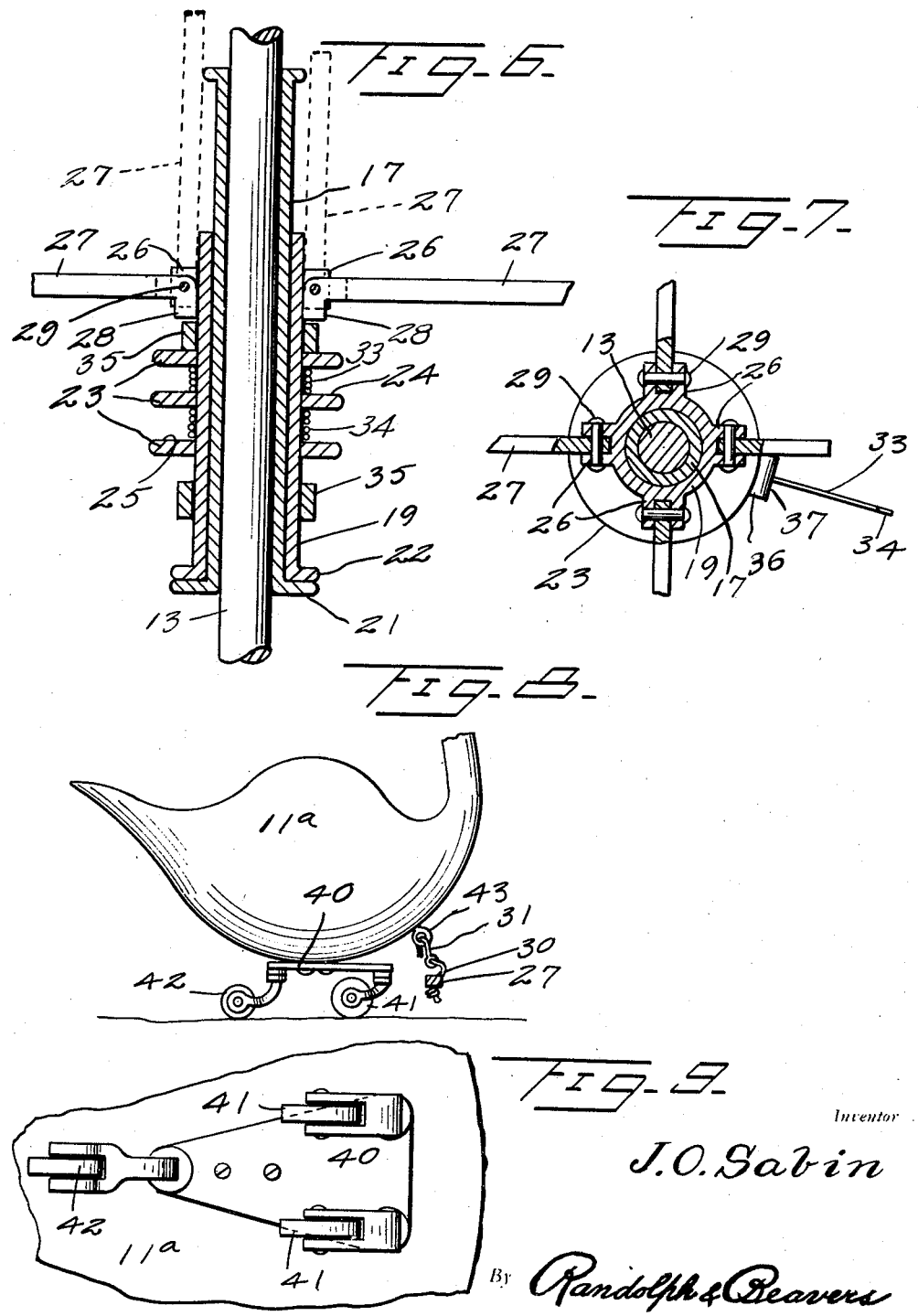
Inventor
J. O. Sabin
By Randolph & Beavers
Attorneys Patented Apr. 3, 1951

2,547,286

UNITED STATES PATENT OFFICE 2,547,286

ANIMATED DECOY

James O. Sabin, Dalbo, Minn.

Application October 18, 1946, Serial No. 704,172

2 Claims. (Cl. 43—3)

This invention relates to a mechanically animated decoy especially adapted for use in hunting duck and geese and by means of which a plurality of decoys or blocks, constructed to simulate the game being hunted and positioned in a locality where such game are likely to land for feeding, are caused to move in a manner to simulate the natural movement of the simulated birds to thereby cause the animated decoys to more readily attract the game being hunted, due to the fact that the game birds in flight will be lulled into security by the movement of the decoys and will alight close by without fear of danger.

More particularly, an object of the invention is to provide a mechanical device adapted to be attached to a plurality of decoys by means of which the decoys can be caused to move in the water and in a manner to simulate the natural movements of the birds represented by the decoys and more especially the movements of such birds when feeding.

Still another object of the invention is to provide a mechanical actuator for decoys of extremely simple construction, which is very light in weight and which is capable of being quickly and easily assembled and positioned for use.

Still another object of the invention is to provide a mechanical decoy actuator which may be readily operated by a hunter from a blind or pit at a point remote to the decoys by a simple pull on a line or flexible element connected to the actuating means.

Various other objects and advantages of the invention will hereinafter become more apparent from the following description of the drawings, illustrating a preferred embodiment thereof, wherein:

Figure 1 is a top plan view of one embodiment of the animated decoy shown in an operative position;

Figure 2 is an enlarged vertical sectional view taken substantially along a plane as indicated by the line 2—2 of Figure 1;

Figure 3 is an enlarged fragmentary side elevational view, partly in vertical section, of the central portion of the mechanical actuator;

Figure 4 is a cross sectional view taken substantially along a plane as indicated by the line 4—4 of Figure 3;

Figure 5 is a vertical sectional view taken substantially along a plane as indicated by the line 5—5 of Figure 4;

Figure 6 is a longitudinal, vertical sectional view taken substantially along a plane as indicated by the line 6—6 of Figure 3, and Figure 7 is a horizontal sectional view taken substantially along a plane as indicated by the line 7—7 of Figure 3.

Referring more specifically to the drawings, the animated decoy in its entirety is designated generally 10 and in the embodiment of the invention herein disclosed includes four decoys 11 constructed to simulate ducks and which may be of any conventional construction, shape, size and coloring and which, being disposed in the water, are formed of a buoyant material so as to float on the surface thereof.

The animated decoy 10 also includes a mechanical actuating means, designated generally 12 for imparting movement to the decoys or blocks 11 to realistically simulate the natural movement of ducks in the water. The actuating means 12 includes a stake 13 having a pointed lower end 14 which is adapted to be driven into the bottom 15 of a body of water the surface of which is indicated by the broken line 16. The stake or post 13 is disposed in upright position and extends to above the surface 16 and provides the sole means of support for the mechanical actuator 12, of which it forms a part. A sleeve 17 is slidably disposed on the stake 13 and removably applied thereto and is provided adjacent its upper end with a set screw 18 for adjustably fastening the sleeve 17 to the stake 13, so that the upper end thereof will be disposed substantially at the level of the surface of the water, as indicated at 16. An outer sleeve 19 is turnably disposed on the sleeve 17 and after being applied thereto, the ends of the sleeve 17 are flared to form an upper retaining collar 20 and a lower retaining collar 21 to prevent removal of the outer sleeve 19. The outer sleeve 19 adjacent its lower end, is flared to form an annular flange or collar 22 which rests on and rotatably engages the lower flange 21 for normally supporting the sleeve 19 relatively to the sleeve 17 and in the position as illustrated in Figure 2. The sleeve 19, intermediate of its ends, is provided with three longitudinally spaced, annular flanges 23 forming an upper annular groove 24 and a lower annular groove 25. Above the flanges 23, the sleeve 19 is provided with preferably four circumferentially spaced pairs of outwardly projecting apertured ears 26.

An arm 27 is pivotally supported between each pair of ears 26, as best illustrated in Figure 7. The arms 27 are provided with downturned inner ends 28 and each of said arms 27, at the apex formed by the downturned end 28, is disposed between the ears of one of the pairs of ears 26 and pivotally connected thereto by a rivet or other fastening 29. When the arms 27 are disposed in substantially horizontal position, as seen in Figure 2, the downturned portions 28 thereof bear against the sleeve 19 to prevent the arms from swinging downwardly below a horizontal position. However, it will be readily apparent that the arms 27 may be swung upwardly on the pivots 29 to positions substantially parallel to the axis of the sleeves 17 and 19. A short flexible member 30 is connected to each arm 27, adjacent its outer end and has a hook 31 connected to its free end and which is adapted to engage an eye fastening 32 which is anchored in and projects from the underside of one of the decoys 11. It will thus be readily apparent that one of the decoys 11 is in this manner connected to each of the arms 27, as clearly illustrated in Figure 2. The hooks 31 are formed of a resilient material and the bill portions thereof normally abut or substantially abut the hook shanks to insure that the decoys 11 will not become accidentally disengaged from the arms 27. It will be readily apparent that the hunter may grasp the decoys 11 by their heads for lifting them out of the water and for thereby swinging the arms 27 upwardly on their pivots 29 so that the decoys may be detached or attached to the mechanical actuator 12 without the necessity of the hunter submerging his hand into the water.

A line 33, or other flexible member, is fastened at one end in any suitable manner in the upper channel or groove 24 and is wound several turns in one direction therearound. A similar line or flexible member 34 is anchored at one end in the lower channel 25 and is wound several turns therearound in the opposite direction. Two split rings 35 are turnably disposed on the sleeve 19, above and beneath the flanges 23. The rings 35 are connected to or formed integral with the inturned terminals or arms 36 of a bar 37 which is spaced outwardly thereby from the flanges 23. Bar 37 is provided with longitudinally spaced openings forming upper and lower eyes or guides 38, 39, respectively. The eye 38 is disposed at substantially the same level as the groove or channel 24 while the eye 39 is disposed at the level of the channel 25, as best illustrated in Figure 3. The line 33 extends through and is guided by the eye 38 and the line 34 extends through and is guided by the eye 39, which eyes are properly spaced from one another for receiving the lines or flexible members 33 and 34 from the channels 24 an 25 from which they extend, as seen in Figure 5. The lines or flexible members 33 and 34 are adapted to extend to a remote point, as for example where a blind is located and within shooting distance of the animated decoy 10.

From the foregoing, it will be readily apparent that a hunter within the blind, previously referred to, but not shown, may by pulling on the line 34 cause the sleeve 19 to revolve in a counterclockwise direction as seen in Figure 1, about the sleeve 17 and post 13 and within the rings 35 to thereby cause the decoys 11 to move in a circle around the stake 13 and in a manner to simulate ducks which are swimming and feeding on the water. The line is pulled very slowly as it will be readily apparent that the decoys 11 execute a complete circle each time that the sleeve 19 is revolved one revolution. The eyes 32 are fastened to the decoys forwardly of their centers, so that when the other line 33 is pulled, the decoys will be caused to turn about and move in the opposite direction, thereby very realistically simulating the normal turning movements of ducks while in the water. It will be readily obvious that as one of the flexible members or lines 33 or 34 is being pulled, said line will be paid off the sleeve 19 while the other line is being wound thereon. The guides 38 and 39 assist in keeping the lines 33 and 34 properly positioned relatively to the grooves 24 and 25 and also tend to keep the lines sufficiently submerged so that they will not be engaged by the arms 27.

From the foregoing description, it will be readily apparent that the only part of the animated decoy 10 which will be disposed above the water surface 16 will be the decoys 11 and the upper part of the stake 13 and as stakes protruding from the surface of a body of water are very common, it will be readily obvious that there is nothing visible which will tend to alarm or frighten a flock of ducks while the swimming movement of the decoys 11 will readily reassure the ducks in flight to cause them to alight on the water close to the decoys.

The number of arms 27 and the length thereof may obviously be varied and various other modifications and changes are contemplated and may obviously be resorted to without departing from the spirit and scope of the invention as hereinafter defined in the appended claims.

I claim:

1. In an animated decoy, a stake adapted to be driven into the bottom of a body of water for positioning said stake in an upright position and with the upper end thereof disposed above the surface, a sleeve detachably and slidably mounted on said stake and having means for detachably securing it thereto, said sleeve having a flange at its lower end and being adapted to be disposed with its upper end adjacent the surface of the water, a second sleeve supported on said flange and rotatably mounted on said first mentioned sleeve, a plurality of arms connected to and projecting radially from said second sleeve, flexible tether members connected to said arms adjacent their free ends and adapted to be detachably fastened to bouyant decoys, said arms being disposed beneath the surface of the water and said decoys being freely supported on the surface thereof, and actuating means connected to said second sleeve to cause the second sleeve and arms to oscillate relatively to the first mentioned sleeve and stake for causing said decoys to be propelled in opposite directions on the surface of the water and in a circle around the stake.

2. An animated decoy as in claim 1, said arms being pivotally connected to the second sleeve for vertical swinging movement relatively thereto, and means to limit the downward swinging movement of the arms and to support the arms in substantially horizontally positions and substantially perpendicular to the sleeves and stake.

JAMES O. SABIN.

REFERENCES CITED

The following references are of record in the file of this patent:

UNITED STATES PATENTS

| Number | Name | Date |
| --- | --- | --- |
| 175,414 | Bouscay, Jr. | Mar. 28, 1876 |
| 437,909 | Seymour | Oct. 7, 1890 |
| 765,093 | Miller | July 12, 1904 |
| 1,376,282 | Kauffman | Apr. 26, 1921 |
| 1,389,926 | Ahlmgren | Sept. 6, 1921 |
| 1,612,604 | Branden | Dec. 28, 1926 |
| 2,252,795 | Weema et al. | Aug. 19, 1941 |